S. M. MEYER AND W. JAMES.
STORAGE BATTERY.
APPLICATION FILED OCT. 27, 1921.
1,437,986.
Patented Dec. 5, 1922.
2 SHEETS—SHEET 1.
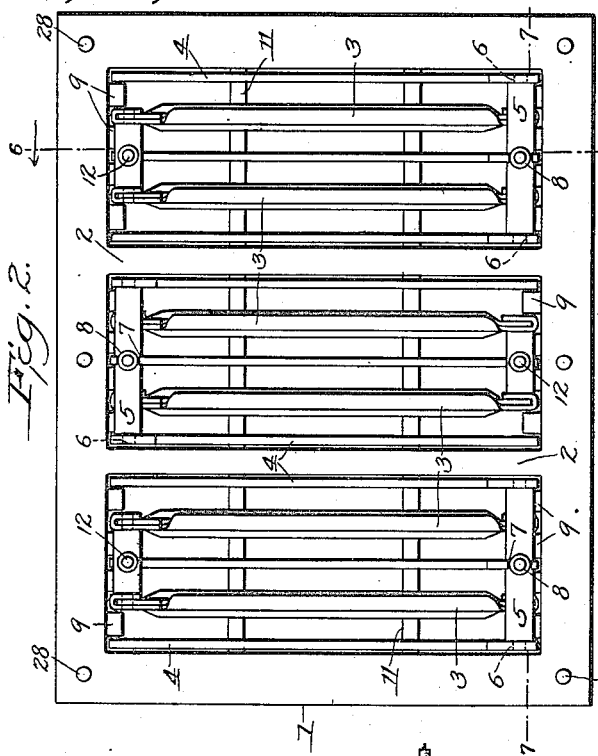
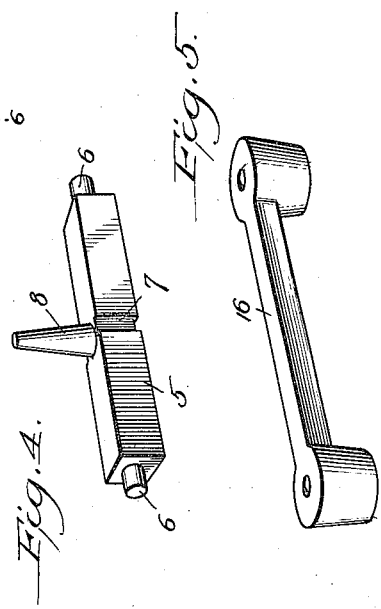
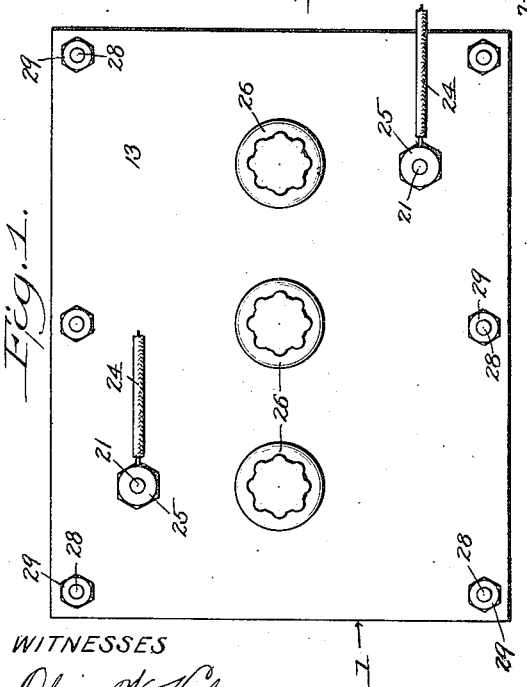
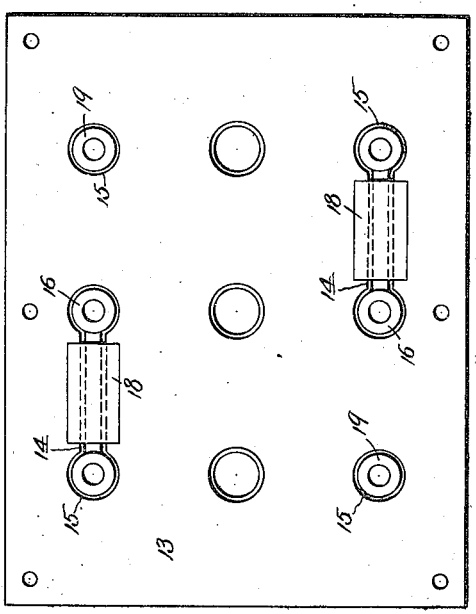
WITNESSES
Oliver W. Holmes
INVENTORS
Svend M. Meyer & William James
BY
Knight Bro
ATTORNEYS S. M. MEYER AND W. JAMES.
STORAGE BATTERY.
APPLICATION FILED OCT. 27, 1921.
1,437,986.
Patented Dec. 5, 1922.
2 SHEETS—SHEET 2.
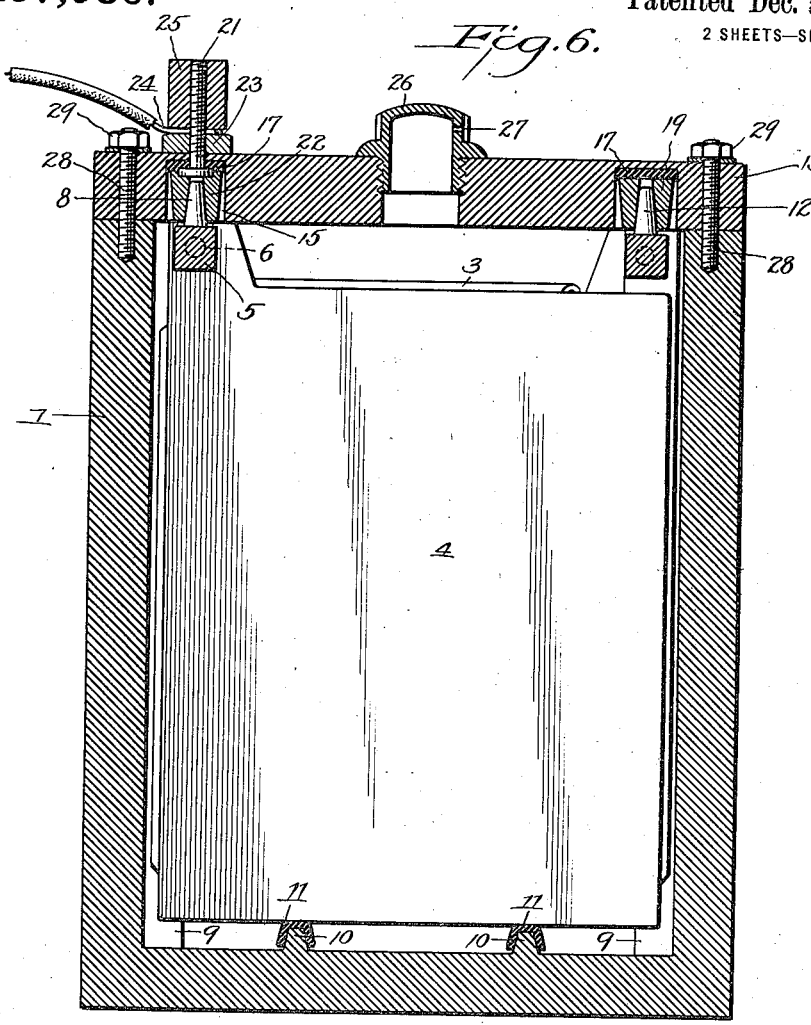
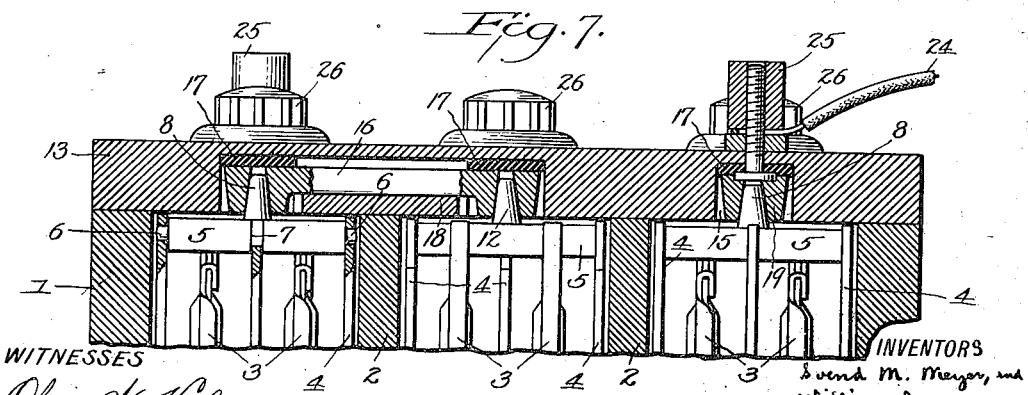
WITNESSES
INVENTORS
BY
ATTORNEY Patented Dec. 5, 1922.

1,437,986

UNITED STATES PATENT OFFICE.

SVEND M. MEYER AND WILLIAM JAMES, OF BROOKLYN, NEW YORK, ASSIGNORS TO MAGNO STORAGE BATTERY CORPORATION, OF NEW YORK, N. Y., A CORPORATION OF DELAWARE.

STORAGE BATTERY.

Application filed October 27, 1921. Serial No. 510,957.

*To all whom it may concern:*

Be it known that we, SVEND M. MEYER and WILLIAM JAMES, citizens of the United States, and residents of the borough of Brooklyn, county of Kings, city and State of New York, have invented certain new and useful Improvements in Storage Batteries, of which the following is a specification.

Our present invention relates to the construction of storage batteries. The object of our invention is to produce a battery that is easily assembled and inspected, withstands shocks without damage and is mechanically strong.

These objects are accomplished by having the cells making up the battery in one container with tight partitions between cells and a cover for the container having all the electrical connections for the electrodes so arranged within it that on removing the cover all electrical connections to the electrodes are broken and any set of electrodes may be removed or inspected. Furthermore the electrodes are mounted in the cells in such a way that they are firmly but elastically held in place and the proper electrical connections made by the putting on of the cover.

In order that our invention may be fully understood, it will first be described in connection with the accompanying drawings and afterwards more particularly pointed out in the annexed claims.

In said drawings:—

Fig. 1 is a plan view of the complete battery.

Fig. 2 is a plan view of the battery with the cover removed.

Fig. 3 is a plan view of the under face of the cover.

Fig. 4 is a perspective view of the connector used to electrically connect and mechanically hold the negative electrodes.

Fig. 5 is a perspective view of the connectors used to make the series connection between cells.

Fig. 6 is a sectional elevation taken on line 6—6 of Fig. 2.

Fig. 7 is a sectional elevation taken on line 7—7 of Fig. 2.

Similar numbers refer to similar parts throughout the views.

Referring to Fig. 2 it is seen that the container 1 is made up with two partitions 2 which divide it into three separate water tight compartments. Container 1 may be of hard rubber or other suitable insulating material. In certain cases more or less cells may be desirable and our construction can be used in such event. Two positive electrodes 3 and three negative electrodes 4 are provided in each cell. We prefer to use composite paste positive electrodes as described in our co-pending application, Serial No. 479801 and metal alloy negative plates as described in our co-pending application, Serial No. 479801. The three negative electrodes are mechanically and electrically connected by the lead connector 5, Fig. 4. The two outside electrodes in each cell are riveted (and may be welded) to the projections 6 while the center negative electrode is tightly held in the groove 7 or it may be welded at that point. The post 8 is of conical form and is used to connect the cells together or to connect them to the terminals of the battery as described hereinafter. Connector 5 is so proportioned that it is of sufficient strength to hold the electrodes in their correct positions while handling them. The positive electrodes 3, Fig. 2, are connected together in a similar manner. It is to be noted that in the center cell the terminal posts of the negative and positive electrodes are at the opposite ends to those of the end cells.

The container 1 is provided with ribs 9 at the ends of each cell and these ribs serve to hold the electrodes at the proper distances apart. In Fig. 6 the electrodes are shown supportd on ribs 10 which are covered with U-shaped soft rubber pieces 11. The space between these ribs is useful to hold any sediment derived from the electrodes, such as active material that might crumble from the positive electrodes. With all the electrodes in the battery sufficient dilute sulphuric acid is added to the cell to cover the plates. From the above description in connection with the drawings it is seen that after the electrodes are assembled in the battery, all parts of the electrodes are below the top surface of the container 1, except the posts 8 by which the electrical connections are made.

Cover 13, Fig. 1, is constructed of a suitable insulating material such as hard rubber and is of sufficient thickness to have formed within its bottom surface grooves 14, to receive cell connectors 16, the form of which is shown in Fig. 5. Discs 17, Fig. 7, of soft rubber or similar material are placed under the ends of the connectors 16, said connectors being held in place in the cover by securing the plate 18 in a recess provided for it, as for example, by cementing it in. Plate 18 may be of the same material as the cover or of any suitable insulating material. Circular recesses 15 are provided in two diagonally opposite corners of the bottom surface of the cover and small holes extend centrally therefrom through which the binding posts are carried to the top of the battery as shown at 21, Fig. 1. Fig. 6 shows the construction of the binding posts where 21 is a screw, preferably, of brass, to the head of which is fastened a circular lead block 22 having a conical seat corresponding in shape to that of the post 8. A soft rubber disc 17 is placed under the head of the screw and nut 23 is tightened sufficiently to hold the screw firmly, but not so tightly as to appreciably deform the disc. Lug 24 of the wire leading to the battery is clamped tightly between nut 23 and nut 25, which we prefer to make of lead.

Cover 13 is further provided with filling caps 26, which are so arranged that one is over the center of each cell when the cover is in place. These provide a means of inspecting the cells for the determination of the level and gravity of the acid. Each cap is provided with a vent 27, Fig. 6, to permit the escape of gas.

By making the battery and cover separately as described it is only necessary to place the cover on the battery and pull it down firmly in place by means of the studs 28 and nuts 29 to make the electrical connections required. This one operation connects the three cells in series and also the binding posts to the positive and negative terminals of the two end cells. The depth of the grooves 14 in the cover and the thickness of the rubber discs 17 are so proportional that when the cover is tightly in place a pressure will exist between the conical seats in the connectors and binding posts and the posts of the electrodes. The soft rubber pieces 11 covering the ribs 10 on which the electrodes are supported permit of some variation in the height of the electrodes.

It is important that the center distances of the conical holes in connectors 16 correspond with the center distances of the cells within certain limits and that grooves 14 be properly located in the cover. These limits are defined by the amount of movement possible. The connectors may move laterally to an extent determined by the clearance between the connectors and the sides of the grooves in which they are mounted. In certain cases the post 8 of one cell and the post 12 of another cell which it is desired to connect may not have their axes parallel. In such cases the connector can adapt itself to the required condititon by bending or by twisting, which is made possible by the deformation of the rubber discs 17 under the pressure applied by pulling the cover into place.

It is to be observed that in the completed battery, the elasticity of the rubber discs back of the connectors at the top and the rubber strips on the ribs at the bottom serves to firmly hold the electrodes and to apply a pressure at all times to insure electrical contact. There is also a cushioning effect in so holding the electrodes between the two bodies of rubber that is valuable in protecting the battery against mechanical shocks.

We claim:—

1. An electric storage battery comprising positive and negative electrodes provided with terminals, a suitable container therefor, a removable cover for said container, electrical connections permanently mounted in the cover and contacting with the terminals of the electrodes, and soft rubber cushions above and below the electrodes so as to hold the electrodes in place.

2. An electric storage battery comprising positive and negative electrodes provided with terminals, a suitable container therefor, resilient rubber supports in said container for said electrodes, a cover removably mounted upon said container, electric connectors movably mounted in said cover in position to contact with the electrode terminals when the cover is in position, and rubber cushions between the cover and said connectors.

3. An electric storage battery comprising positive and negative electrodes provided with conical terminals, a suitable container therefor, a removable cover for said container, electrical connectors having conical seats adapted to fit over the electrode terminals and mounted in the cover, and soft rubber cushions for maintaining the electrical connectors firmly in contact with the electrode terminals when the cover of the container is in place.

4. An electric storage battery comprising positive and negative electrodes provided with conical terminals, a suitable container therefor, a cover for said container, electrical connectors having conical seats adapted to fit over the electrode terminals and movably mounted in the cover, and soft rubber cushions for maintaining the electrical connectors firmly in contact with the electrode terminals when the cover of the container is in place.

5. An electric storage battery comprising positive and negative electrodes provided with terminals, a suitable container therefor, transverse ribs in the bottom of the container covered with soft rubber cushions, a removable cover for the container, electrical connectors for the electrode terminals mounted in grooves in said cover, soft rubber cushions in said grooves back of the electrical connections, and means for fastening the cover to the container.

6. An electric storage battery comprising positive and negative electrodes provided with terminals, a suitable container therefor, transverse ribs in the bottom of the container covered with soft rubber cushions, a cover for the container, electrical connectors for the electrode terminals mounted in grooves in said cover, soft rubber cushions in said grooves back of the electrical connectors, the combined height of the electrodes and electrical connectors being slightly greater than the distance between the uncompressed rubber cushions in the cover and the bottom of the container, and means for fastening the cover in place on the container.

SVEND M. MEYER.
WILLIAM JAMES.